United States Patent [19]

Tomoda et al.

[11] Patent Number: 5,029,153

[45] Date of Patent: Jul. 2, 1991

[54] OPTICAL DISK REPRODUCING DEVICE

[75] Inventors: Haruhisa Tomoda, Kashihara; Yasuomi Shimada, Ikoma, both of Japan

[73] Assignee: Matsushita Electric Industrial Co., Ltd., Osaka, Japan

[21] Appl. No.: 238,226

[22] Filed: Aug. 30, 1988

[30] Foreign Application Priority Data

Sep. 2, 1987 [JP] Japan .................................. 62-219554

[51] Int. Cl.$^5$ .............................................. G11B 27/02
[52] U.S. Cl. ..................................................... 369/83
[58] Field of Search ............................ 369/32, 83-85; 360/13, 15; 358/311

[56] References Cited

U.S. PATENT DOCUMENTS 4,916,682  4/1990  Tomoda et al. .................. 369/83 X

FOREIGN PATENT DOCUMENTS

| 0276143 | 7/1988 | European Pat. Off. |
| 2274989 | 9/1976 | France . |
| 263387 | 12/1985 | Japan . |
| 162876 | 7/1986 | Japan . |
| 066491 | 3/1987 | Japan . |
| 084477 | 4/1987 | Japan . |
| 134856 | 6/1987 | Japan . |
| 161581 | 7/1988 | Japan . |
| 1-67784 | 3/1989 | Japan ..................................... 369/83 |
| 1-88978 | 4/1989 | Japan ..................................... 369/83 |

Primary Examiner—Donald McElheny, Jr.
Attorney, Agent, or Firm—Spencer & Frank

[57] ABSTRACT

An optical disk reproducing device is used when recording a plurality of music pieces, which have been recorded on an optical disk, on a recording medium such as a magnetic recording tape by using a magnetic recording and reproducing device, etc. in order to make it easy to edit and set the number of music pieces which is recordable to minimize a remaining time of a recording tape. To this end, the optical disk reproducing device stores the number of music pieces, which can be recorded within a predetermined edition time that has been inputted beforehand, sequentially starting from a first music piece recorded on the optical disk, and thereafter selects music pieces, which are recordable by using a remaining time that has occurred in the predetermined edition time, from among remaining music pieces which have not yet been stored, and then stores the selected music pieces or compares the length of a previously stored music piece bearing the last music number with the length of the respective remaining music pieces which have not been stored, and automatically calculates to exchange the previously stored music piece bearing the last music number with any music piece which is able to shorten the remaining time and thereby to effect sequential setting of the number of music pieces, whereby an automatic music number edition with a minimum remaining time of a recording tape becomes possible.

5 Claims, 6 Drawing Sheets

24 — DISPLAY SECTION
25a — EDITION SPECIFYING KEY
25b — EDITION TIME INPUT KEY
25c — OPTIONAL MUSIC PIECE STORAGE KEY
25d — OPTIONAL MUSIC PIECE DELETION KEY
25e — A/B SIDE EXCHANGE KEY
25f — REMAINING TIME REDUCTION KEY

OPTICAL DISK REPRODUCING DEVICE

BACKGROUND OF THE INVENTION

The present invention relates to an optical disk reproducing device such as a compact disk player.

Previously known compact disk players of this kind have such a construction as shown in FIGS. 5 to 8.

Figure 5:
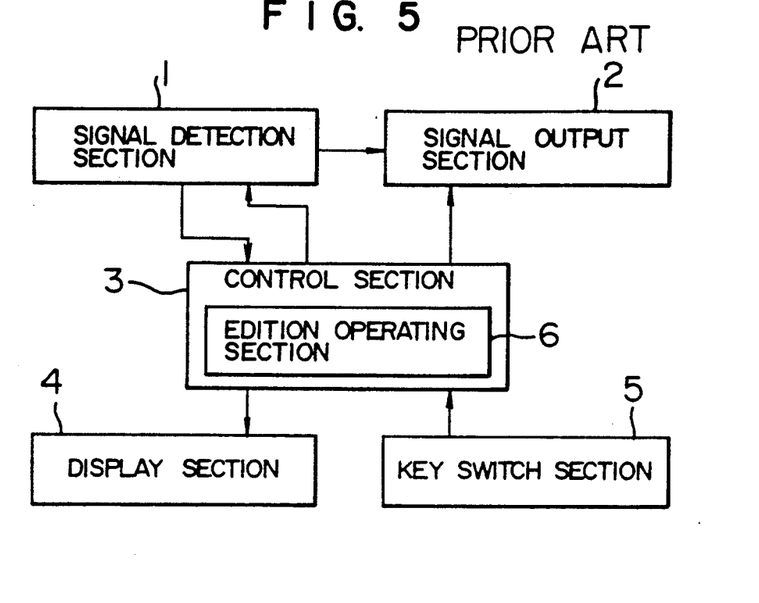
FIG. 5 is a block diagram schematically showing an optical disk reproducing device of the prior art.
Figure 7:
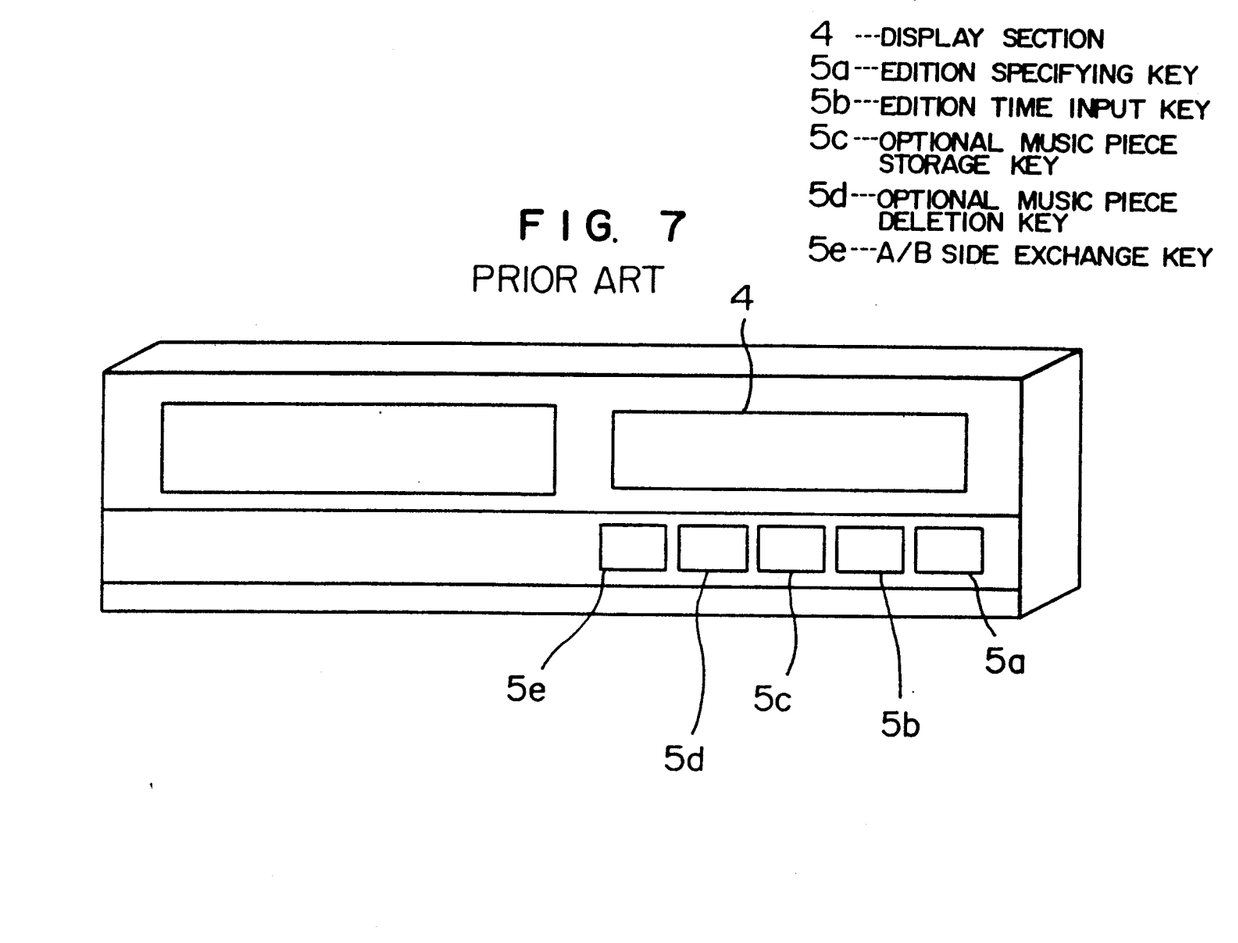
FIG. 7 is a perspective view showing the external appearance of the prior art device shown in FIG. 5.

In FIG. 5, numeral 1 is a signal detection section composed of an optical pickup, etc. for detecting or reading music information and play time information recorded on an optical disk (hereinafter simply referred to as a disk), 2 is a signal output section for processing and converting the information read by the signal detection section 1 into an audio signal to produce an output signal, and 3 is a control section for controlling the signal detection section 1 and the signal output section 2, and it includes an edition operating section 6 which will be described later in detail. Numeral 4 is a display section for displaying via the control section 3 the information such as a play time read by the signal detection section 1, a remaining time occurring in an edition operation, etc. As shown in FIG. 7, numeral 5 is a key switch section composed of an edition specifying key 5a for specifying the edition of music pieces to be played, an edition time input key 5b for inputting an edition time, an optional music piece storage key 5c for storing an optional reproduced music piece, an optional music piece deletion key 5d for deleting an optional stored music piece, an A/B side exchange key 5e for exchanging the side to be edited, etc. (It should be noted that the phrase "to specify" is used in the same sense as the phrase "to designate" in this specification.)

Figure 6:
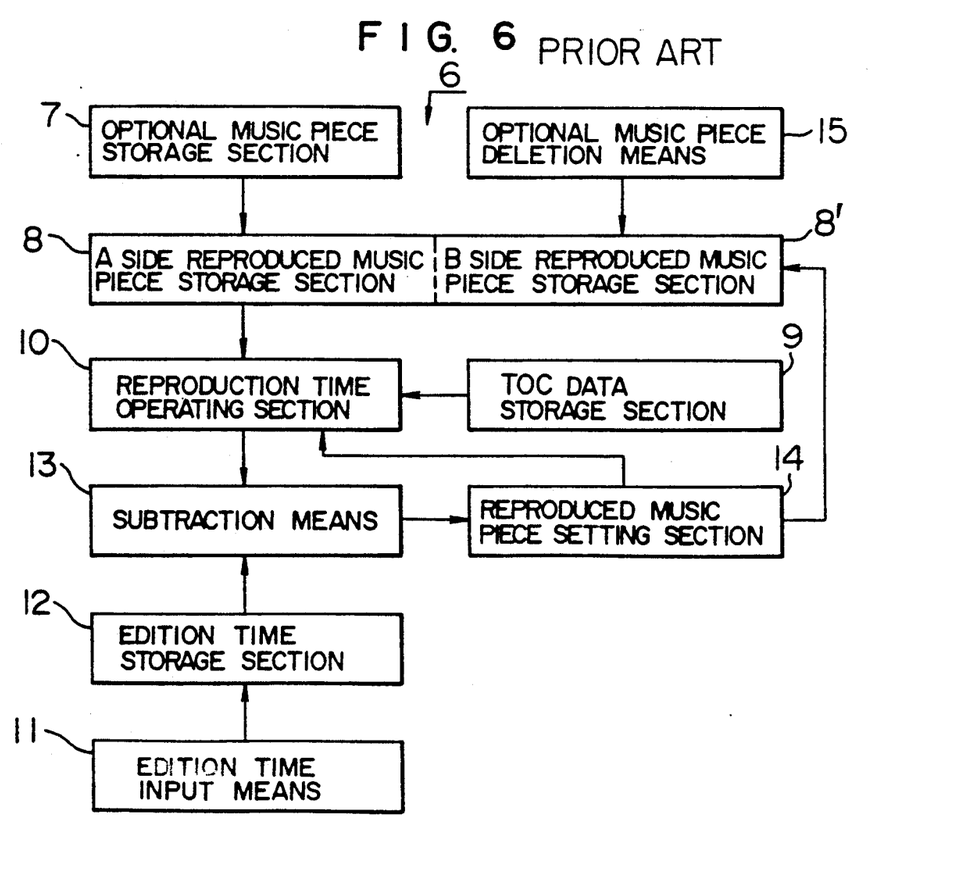
FIG. 6 is a block diagram schematically showing the main part of the prior art device shown in FIG. 5.

The edition operating section 6 includes, as shown in FIG. 6, a TOC (TABLE OF CONTENTS) data storage section 9 for storing TOC information with respect to the number, reproduction time, etc. of music pieces recorded on a disk which has been detected by the signal detection section 1, a reproduction time operating (calculating) section 10 for calculating the reproduction times of respective music pieces to be reproduced from the TOC information and calculating a total sum of the reproduction times, an edition time input means 11 for inputting the time available for editing music pieces to be recorded on the A side and the B side of a magnetic recording tape, etc. when recording the information recorded on a disk on the magnetic recording tape, an edition time storage section 12 for storing the inputted edition time, a subtraction means 13 for subtracting the reproduction time obtained by the reproduction time operating section 10 from a half value of the stored edition time to obtain a remaining time, a reproduced music piece setting section 14 for judging the remaining time obtained by the subtraction means 13 while effecting the automatic edition and setting music pieces to be reproduced within the edition time, A side reproduced music piece storage section 8 and B side reproduced music piece storage section 8' for storing the music pieces set by the reproduced music piece setting section 14, an optional music piece storage means 7 for storing any optional music piece during a manual edition, and an optional music piece deleting means 15 for deleting an optional music piece from the stored music pieces.

Figure 8:
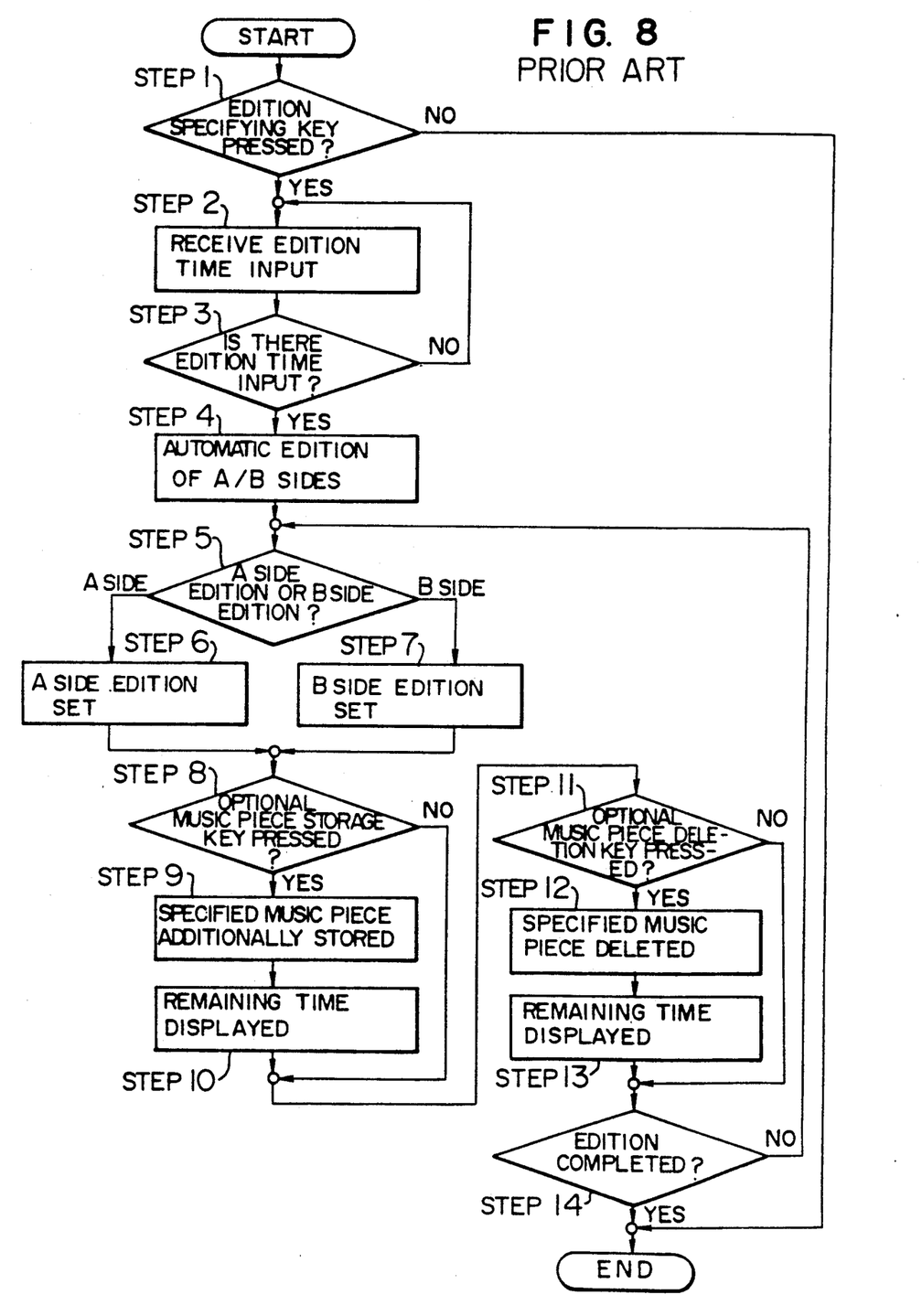
FIG. 8 is a flowchart for explaining the control operation performed by the prior art device shown in FIG. 5.

The processing control as shown in the flowchart of FIG. 8 was carried out by using the construction described above.

In step 1, whether the edition specifying key 5a has been pressed, or not is decided. If it is "yes", the processing is shifted to step 2, whereas, if it is "no", the processing is ended. Step 2 receives an edition time input such as 60 minutes, etc. corresponding to the length of a magnetic tape which is inputted by the edition time input key 5b. In step 3, whether the edition time has been inputted or not is decided. If it is "yes", the processing is shifted to step 4, whereas, if it is "no", the processing is returned to step 2 and the process steps 2 to 3 are repeated until an input is received by step 2. In step 4, the reproduction times of music pieces are obtained by the reproduced music piece setting section 14 sequentially starting from a first one of the music pieces recorded on the optical disk, and a total sum of the reproduction times is compared with a half value of the edition time in accordance with the result of the operation of the subtraction means 13, as the number of the reproduced music pieces is increased, thereby effecting the setting of music pieces to be reproduced on the A side, and then the setting of music pieces to be reproduced on the B side is effected using remaining music pieces to be reproduced. In step 5, whether the subsequent operation should be made on the A side edition or on the B side edition is decided from the input by the A/B side exchange key 5e. If it is decided that the A side edition is the case, the processing is shifted to step 6, whereas, if it is decided that the B side edition is the case, the processing is shifted to step 7. In step 6, the display, etc. are set to the A side edition mode, while, in step 7, the display, etc. are set to the B side edition mode. In step 8, whether there is an input from the optional music piece storage key 5c or not is decided. If it is "yes", the processing is shifted to step 9, whereas, if it is "no", the processing is jumped to step 11. In step 9, an inputted specified music piece is additionally stored in the A side reproduced music piece storage section 8 or the B side reproduced music piece storage section 8'. In step 10, the reproduction time of the additionally stored specified music piece is obtained by the reproduction time operating section 10, and the remaining time is obtained by the subtraction means 13, and the results thereof are displayed by the display section 4. In step 11, whether the optional music piece deletion key 5d has been pressed or not is decided. If it is "yes", the processing is shifted to step 12, whereas, if it is "no", the processing is jumped to step 14. In step 12, the inputted specified music piece is searched for in the A side reproduced music piece storage section 8 and the B side reproduced music piece storage section 8 and deleted. In step 13, the reproduction time of the deleted specified music piece is obtained by the reproduction time operating section 10, and the remaining time is obtained by the subtraction means 13, and the results thereof are displayed by the display section 4. In step 14, whether the edition is completed or not is decided. If it is "yes", the processing is ended. If it is "no", the processing is returned to step 5, and the processings of steps 5 to 14 are repeated until the edition is completed.

With the prior art construction as described above, however, there has been the following disadvantages. That is, when the music pieces recorded on an optical disk are sequentially distributed to the A side and the B side by turns during the automatic edition and when a remaining time has occurred in the A side or the B side, a very complicated processing has been required if it is intended to effect the edition with a reduced remaining time. For example, if the remaining time of the A side is to be reduced, it is necessary for an operator to have a music piece other than those recorded on the A side stored additionally and to judge whether the edition time is exceeded or not in accordance with the display of the remaining time, and, if the edition time is exceeded, to delete the additionally stored music by the optional music piece deletion key 5d and then to add another music piece and judge the remaining time again. If the edition time is not exceeded at that time, it, is decided whether the remaining time at that time is shorter than the previous remaining time or not. If the remaining time at that time is decided to be shorter than the previous remaining time, the added music piece is stored. The above-mentioned steps are repeated to search for and add a music piece which provides the shortest remaining time. If the searched music piece coincides with one of the B side reproduction music pieces, the coincident music piece is deleted from the B side reproduction music pieces. Then, the same processings are applied to the B side.

In this way, very complicated and troublesome processings of the calculation and judgement of the remaining time by the operator is required to effect the edition with the shortest remaining time.

SUMMARY OF THE INVENTION

The present invention is intended to overcome the disadvantage described above, and the object of the present invention is to provide an optical disk reproducing device which can perform the edition with a reduced remaining time through a very simple operation.

In order to attain this object, the present invention proposes an optical disk reproducing device comprising: a signal detection section for detecting information recorded on an optical disk; a TOC (Table of Contents) data storage section for storing TOC information with respect to the optical disk detected by the signal detection section; a reproduction time operating (calculating) section for calculating from the TOC information reproduction times of respective music pieces to be reproduced and a total sum of the reproduction times; edition time input means for inputting an edition time usable for editing and recording music pieces recorded on the optical disk on a recording medium; an edition time storage section for storing the inputted edition time; subtraction means for subtracting the reproduction time obtained by the reproduction time operating section from the edition time thereby to obtain remaining time; a reproduced music piece setting section for sequentially setting and storing the numbers of a plurality of reproduced music pieces starting from a first music piece recorded on the optical disk by judging that the remaining time obtained by and supplied from the subtraction means does not become less than zero; and a remaining time reduction operating (calculating) section including means for additionally storing the number of a music piece other than those already stored if it is determined that the additional music piece is able to be recorded within the remaining time after the numbers of reproduced music pieces have been set and stored by the reproduced music piece setting section, and means for comparing the play time of a music piece corresponding to the last music number in the already stored music pieces with the play time of one of music pieces which have not yet been stored, and then replacing the last music number with the music number of a music piece providing a shorter remaining time and storing the latter music number.

In the operation of the device of the present invention, when the music pieces recorded on an optical disk have been sequentially distributed to the A side and the B side of a magnetic recording tape respectively, by an automatic edition and when remaining times of the A side and the B side have occurred respectively, if the remaining time reduction is specified, the device operates to search for a music piece other than the edited music pieces, to add the searched music piece to the edited music pieces, to calculate a remaining time occurring at this time, to compare the calculated remaining time with the previous remaining time, and then to store the calculated remaining time, if it is decided that the calculated remaining time is shorter than the previous remaining time from the result of the comparison. Further, by exchanging one of the edited music pieces with any additional music piece, a corresponding remaining time is calculated and is subjected to a comparison. These processings are repeated to search for and select a music piece providing the shortest remaining time. If it is impossible to find any other music piece providing a remaining time falling within a time length of the previous remaining time, the replacement of the last music piece in the edited music pieces by a music piece other than the edited music pieces is repeated to select a music piece providing the shortest remaining time. In this way, it is possible to automatically select and add a music piece providing the shortest remaining time thereby to accomplishing an optimum edition of music pieces to be recorded on an recording medium.

DESCRIPTION OF THE PREFERRED EMBODIMENTS

An embodiment of the present invention will be explained with reference to FIGS. 1 to 4.

Figure 1:
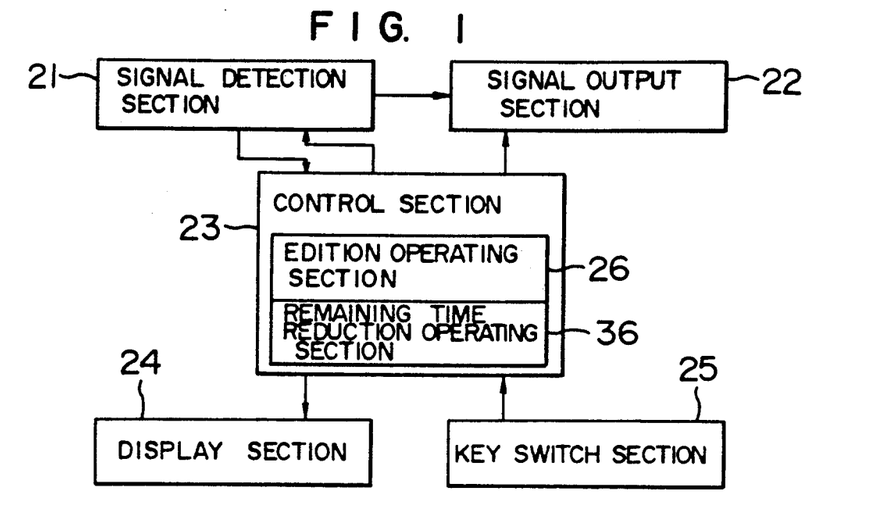
FIG. 1 is a block diagram schematically showing an optical disk reproducing device of an embodiment of the present invention.

In these figures, 21 and 22 designate a signal detection section and a signal output section, respectively, which have the same function as that of the prior art device. Numeral 23 is a control section for controlling the signal detection section 21 and the signal output section 22. The control section 23 comprises, as a part thereof, an edition operating section 26 and a remaining time reduction operating section 36 which will be described later in detail. Numeral 24 is a display section for displaying the information such as a play time read by the signal detection section 21, a remaining time occurring while the edition operating processings are performed, etc.

Figure 3:
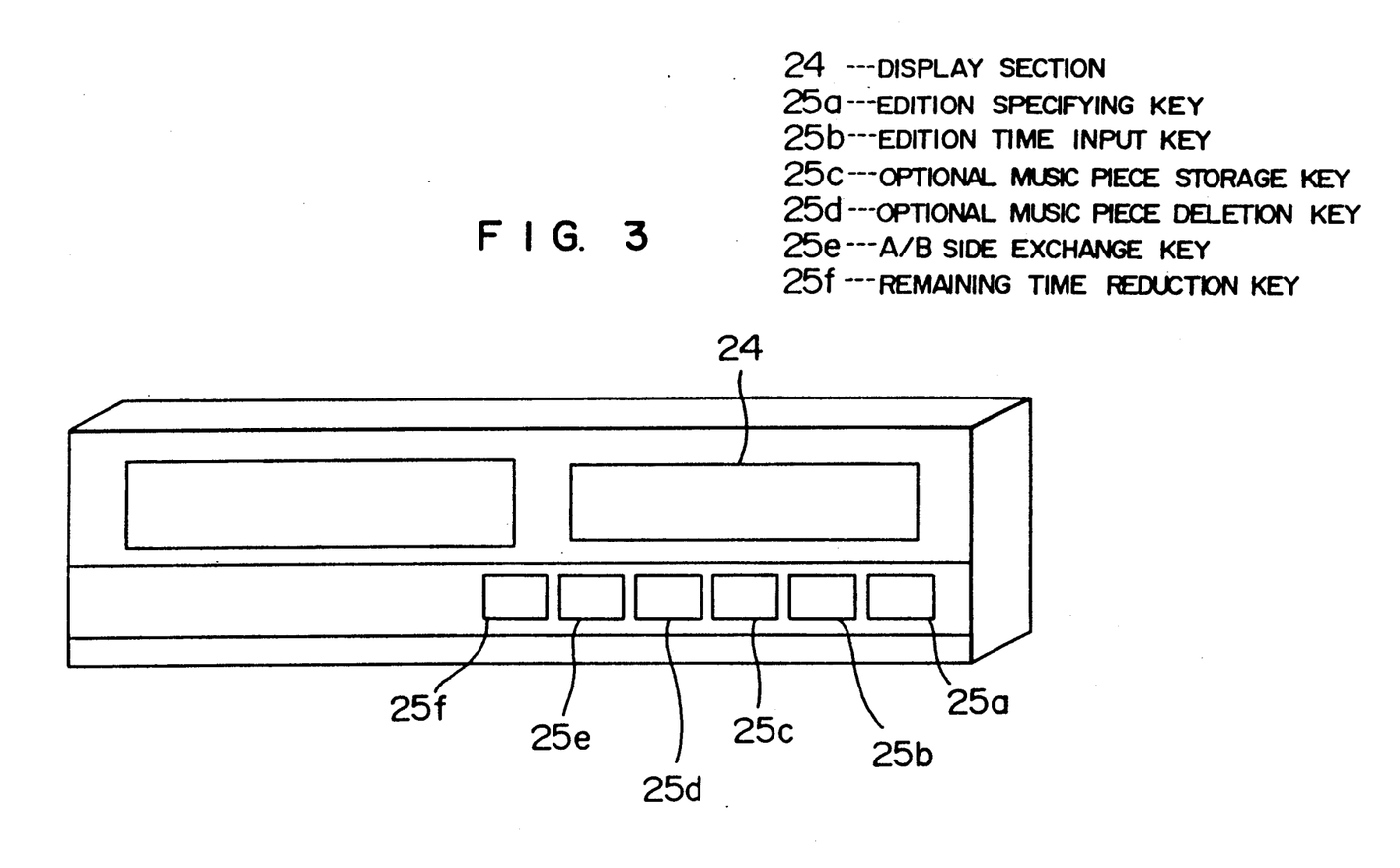
FIG. 3 is a perspective view showing the external appearance of the device shown in FIG. 1.

Numeral 25 designates a key switch section including, as shown in FIG. 3, an edition specifying key 25a for specifying the edition of music pieces to be played, an edition time input key 25b for inputting the time usable for the edition, an optional music piece storage key 25c for storing an optional reproduced music piece, an optional music piece deletion key 25d for deleting an optional stored music piece, an A/B side exchange key 25e for exchanging the side of a recording medium to be edited during the edition, and a remaining time reduction key 25f for specifying the function of reducing a remaining time occurring after an edition has been effected.

Figure 2:
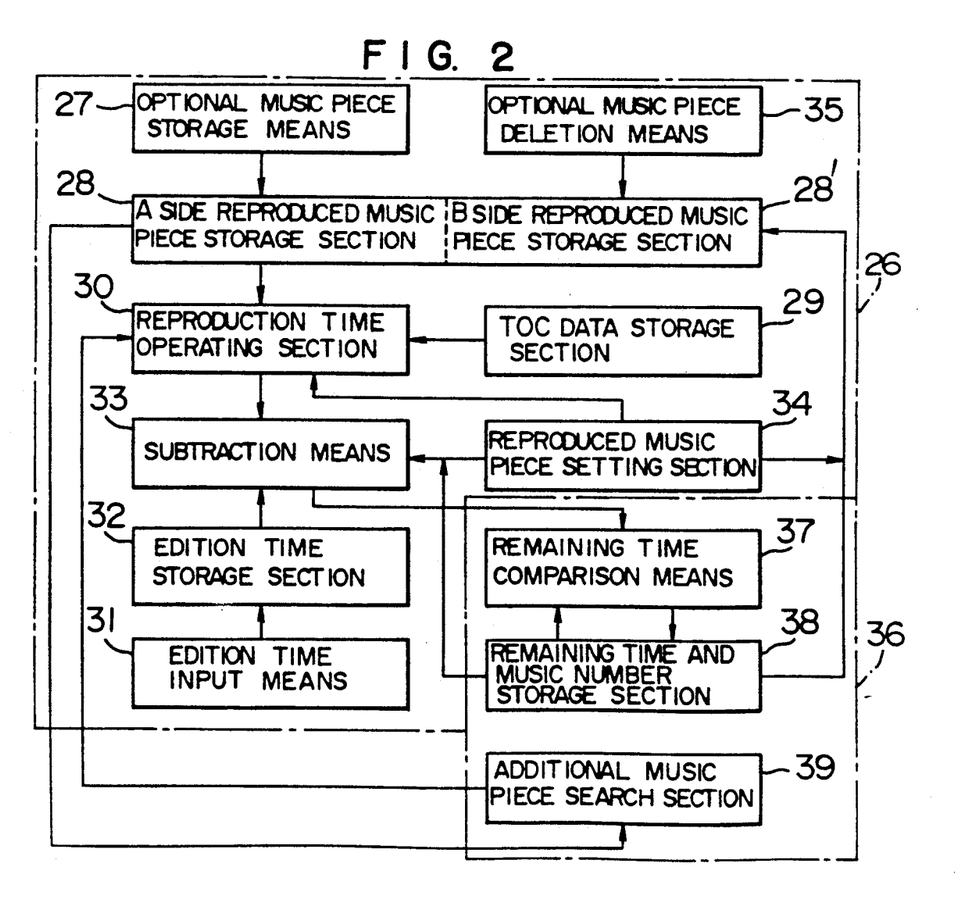
FIG. 2 is a block diagram schematically showing the main part of the device shown in FIG. 1.

As shown in FIG. 2, the edition operating section 26 includes an optional music piece storage means 27, an A side reproduced music piece storage section 28, a B side reproduced music piece storage section 28', a TOC data storage section 29, a reproduction time operating (calculating) section 30, an edition time input means 31, an edition time storage section 32, a subtraction means 33, an optional music piece deletion means 35, and a reproduced music piece setting section 34 for setting music pieces to be reproduced within the edition time by judging the values obtained by the subtraction means 33 or the values stored in a remaining time and music number storage section 38 which will be described later. These constituent elements have the same function as that of the corresponding constituent elements of the prior art device.

The remaining time reduction operating section 36 includes, as shown in FIG. 2, an additional music piece search section 39 for searching and adding a music piece which is not included in the A side or B side reproduced music piece storage section 28 or 28' and for commanding the calculation of the reproduction time when a music piece is added, a remaining time comparison means 37 for comparing the remaining time obtained by subtracting the reproduction time obtained by the additional music piece search section 39 from the edition time, with the remaining time obtained previously, and a remaining time and music number storage section 38 for storing a shorter remaining time decided in accordance with the result of comparison performed by the remaining time comparison means 37, as well as the number of the music piece added at this time.

Figure 4:
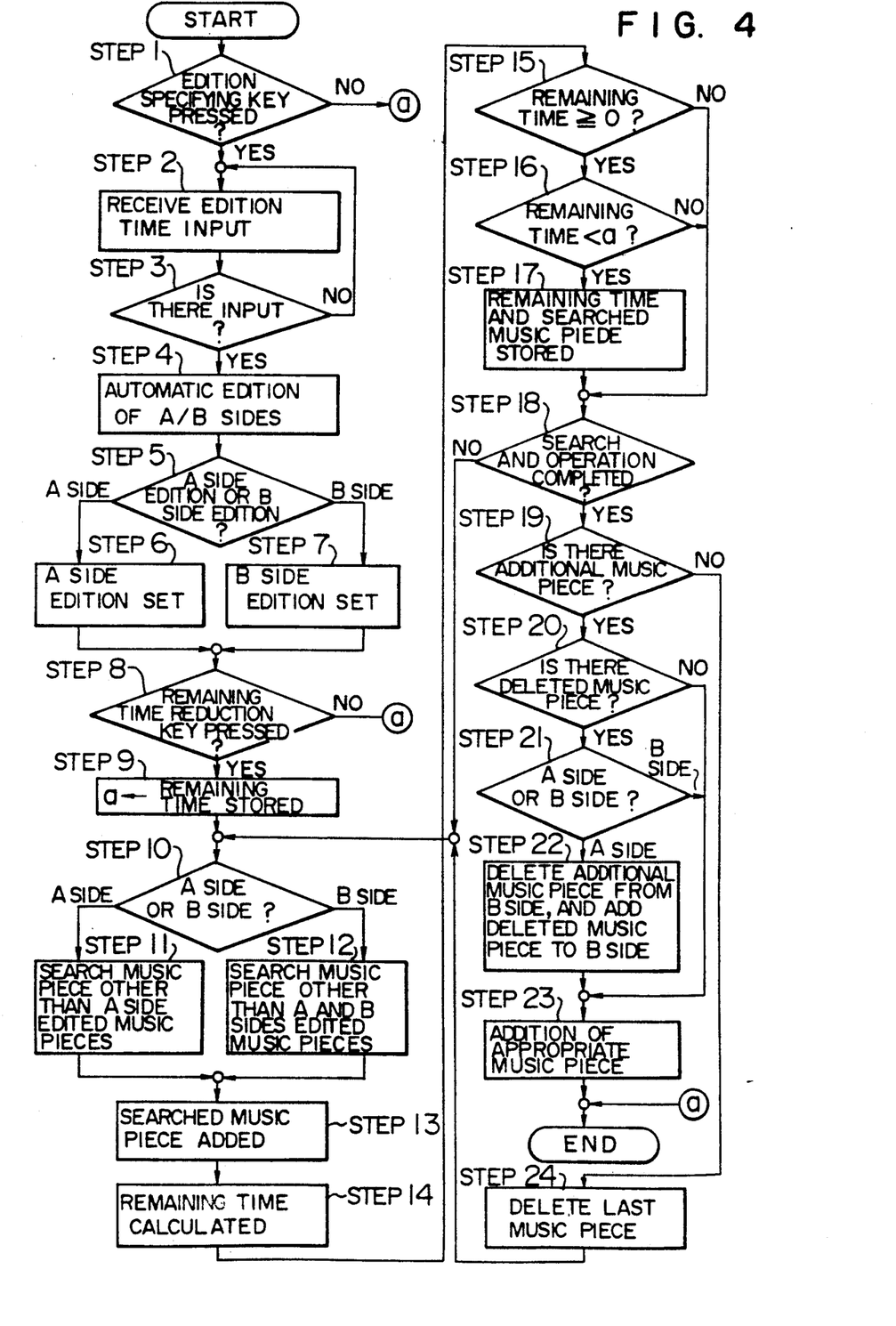
FIG. 4 is a flowchart for automatically searching for a music piece providing a reduced remaining time and effecting addition and replacement of a music piece under the edition processing.

The operation of the optical disk reproducing device of an embodiment of the present invention having the construction as described above will be explained with reference to the flowchart shown in FIG. 4.

Steps 1 to 7 are not explained here since they are entirely the same as those of the prior art shown in FIG. 8. In step 8, whether the remaining time reduction key 25f has been pressed or not is decided. If it is "yes", the processing is shifted to step 9, whereas, if it is "no", the processing is ended. In step 9, a remaining time of the A side or the B side resulting from the A/B side automatic edition is stored in the remaining time and music number storage section 38. In step 10, a decision is made as to which one of the A side edition and the B side edition should be effected. If the A side edition should be effected, the processing is shifted to step 11, whereas, if the B side edition should be effected, the processing is shifted to step 12. In step 11, music pieces other than those to be edited on the A side are searched sequentially starting from a first music piece thereof. In step 12, music pieces other than those to be edited on the A and B sides are searched sequentially starting from a first music piece thereof. In step 13, the music piece searched in step 11 or step 12 is added to the edited music pieces, and the total reproduction time is calculated in the reproduction time operating section 30. In step 14, a remaining time which is a difference between the total reproduction time obtained in step 13 and a half value of the edition time is calculated in the subtraction means 33. In step 15, whether the remaining time obtained in step 14 is not less than zero is decided. If it is "yes", the processing is shifted to step 16, whereas, it is "no", the processing is jumped to step 18. In step 16, a decision is made by the remaining time comparison means 37 as to whether the remaining time obtained in step 14 is smaller than the remaining time value a stored in the remaining time and music number storage section 38. If it is "yes", the processing is shifted to step 17, whereas, if it is "no", the processing is shifted to step 18. In step 17, the remaining time obtained in step 14 and the number of the music piece searched at this time are stored in the remaining time and music number storage section 38. In step 18, whether the search operation for all the music pieces have been completed or not is decided. If it is "yes", the processing is shifted to step 19, whereas, if it is "no", the processing is returned to step 10, and the processings of steps 10 to 18 are repeated until the above-mentioned search operation is completed. In step 19, after the search has been completed as described above, a decision is made as to whether there is an additional music piece providing a remaining time shorter than the initial remaining time. If it is "yes", the processing is shifted to step 20, whereas, if it is "no", the processing is step 24. In step 24, the last one of the music pieces to be edited on the A side or the B side is deleted, and then the processing is returned to step 10 to perform the search operation again from the outset, thereby to replace the last music piece with a music piece providing a shorter remaining time. In step 20, a decision is made as to whether there is a music piece deleted in step 24 or not. If it is "yes", the processing is shifted to step 21, whereas, if it is "no", the processing is shifted to step 23. In step 21, a decision is made as to which one of the A side edition and the B side edition is performed. If the A side edition is the case, the processing is shifted to step 22, whereas, if the B side is the case, the processing is shifted to step 23. In step 22, if there is a music piece to be added to the A side and this music piece is included in the B side edition music pieces, this music piece is deleted from the B side edition music pieces, on the other hand, a music piece deleted from the A side edition music pieces is added to the B side edition music pieces to be stored as one of the B side music pieces. In step, 23, a music piece providing a shorter remaining time obtained through the above-described steps is added to and stored in the A side reproduced music piece storage section 28 or the B side reproduced music piece storage section 28'.

As described above, in accordance with this embodiment of the present invention, after the completion of the automatic edition, if it is desired to reduce the remaining time of the A side, the A/B side exchange key 25e is pressed to have the edition performed by the A side edition, and thereafter the remaining time reduction key 25f is pressed. Then, the remaining time reduction operating section 36 repeats the processings of searching for music piece other than the A side edition music pieces, calculating the remaining time when the searched music piece is added, and comparing the calculated remaining time with the previous remaining time, thereby to find a music piece providing the shortest remaining time. If an appropriate music piece can not be found, a search is continued to find a substitutional music piece providing a remaining time, which falls within the remaining time occurring when the last music piece of the A side edition music pieces has been deleted, in the same manner as described above. In this case, if the searched music piece to be added to the A side edition music pieces is included in the B side edition music pieces, this music piece is deleted from the B side edition music pieces. On the other hand, a music piece deleted from the A side is added to the B side. Next, if an appropriate additional music piece to be added to the A side is found, it is added to and stored in the A side. Further, with respect to the reduction of the remaining time of the B side, the addition and replacement of a searched music piece are performed only on the B side. In this way, the reduction of a remaining time after the completion of an automatic edition can be performed in the optimum manner.

Although, in this embodiment, the total reproduction time of both A and B sides of a recording medium (a magnetic tape) is inputted by the edition time input key, the reproduction time of only one of the A and B sides may be inputted. In this case, it is not necessary to perform the half value calculation of the edition time.

Further, in this embodiment, an additional music piece to be added is searched among the music pieces other than those of the already stored music numbers, thereby to avoid duplicate recording of the same music piece on one and the same magnetic tape. However, if it is not the case, an additional music piece to be added can be searched easily among all the music pieces recorded on the optical disk.

As is apparent from the foregoing description of the embodiments of the present invention, in accordance with the present invention, it is made possible to automatically search a music piece adapted to reduce a remaining time, which occurs after the A/B side edition has been completed, and to easily accomplish the exchange of music pieces to be edited or the addition and storing of an appropriate additional music piece.

What is claimed is:

1. An optical disk reproducing device comprising:
   signal detection means for detecting information recorded on an optical disk;
   TOC (Table of Contents) data storage means for storing TOC information with respect to the information recorded on the optical disk and detected by said signal detection means;
   reproduction time operating means for calculating, from the TOC information, reproduction times of respective music pieces to be reproduced and a total sum of the reproduction times;
   edition time input means for inputting an edition time when recording music pieces on the optical disk by a separate recording device;
   edition time storage means for storing the inputted edition time;
   subtraction means for subtracting the reproduction time obtained by said reproduction time operating means from the edition time to obtain a remaining time;
   reproduced music piece setting means for sequentially setting and storing the numbers of a plurality of reproduced music pieces starting from a first music piece recorded on the optical disk by judging that the remaining time obtained by and supplied from said subtraction means does not become less than zero; and
   a remaining time reduction operating section including:
      means for storing the number of an additional music piece other than those already stored, the additional music piece being recorded within the remaining time after the numbers of reproduced music pieces have been set and stored by said reproduced music piece setting means; and
      means for comparing the play time of a music piece corresponding to the last music number stored in the already stored music pieces with the play time of one of music pieces which have not yet been stored; and
      means for replacing the last music number with a music number corresponding to a music piece providing a shorter remaining time as determined by the comparison means and for storing the latter music number corresponding to the shorter music piece.

2. An optical disk reproducing device according to claim 1, wherein said means for storing the number of an additional music piece selects music pieces recordable within the remaining time after said reproduced music piece setting means has set and stored music pieces to be recorded, and additionally stores the number of a music piece corresponding to a music piece with a play time such that a minimum remaining time is produced from among the selected music pieces.

3. An optical disk reproducing device comprising:
   signal detection means for detecting information recorded on an optical disk;
   TOC (Table of Contents) data storage means for storing TOC information of an optical disk detected by said signal detection means;
   reproduction time operating means for calculating, from the TOC information, reproduction times of respective music pieces to be reproduced and a total sum of the reproduction times;
   edition time input means for inputting an edition time when recording music pieces on the optical disk by a separate recording device having A and B recording sides;
   edition time storage means for storing an inputted edition time;
   subtraction means for calculating a half value of the edition time and for subtracting the reproduction time obtained by said reproduction time operating means from the half value of the edition time to obtain a remaining time; reproduced music piece setting means for judging the remaining time obtained by said subtraction means and for setting music pieces to be reproduced within the edition time;
   A side/B side reproduced music piece storage means for storing the set music pieces;
   additional music piece search means for searching for a music piece which has not been stored in said A side/B side reproduced music piece storage means and for calculating a reproduction time and a remaining time when the searched music piece is added;
   remaining time comparison means for comparing the remaining time obtained by said additional music piece search means with a remaining time already obtained; and remaining time and music number storage means for storing the shorter remaining time and the number of the added music piece based on the comparison by said remaining time comparison means.

4. An optical disk reproducing device according to claim 3, wherein said A side/B side reproduced music piece storage means comprises two sections, one section storing the music pieces set on the A side of the recording device, the other section storing the music pieces set on the B side of the recording device.

5. An optical disk reproducing device according to claim 3, wherein said reproduced music piece setting means judges the remaining time stored in said remaining time and music number storage means.

* * * * *